US009223386B2

United States Patent
Lu et al.

(10) Patent No.: US 9,223,386 B2
(45) Date of Patent: *Dec. 29, 2015

(54) INTERACTIVE POINTING DEVICE CAPABLE OF SWITCHING CAPTURE RANGES AND METHOD FOR SWITCHING CAPTURE RANGES FOR USE IN INTERACTIVE POINTING DEVICE

(75) Inventors: Chih Hung Lu, Hsinchu (TW); En Feng Hsu, Hsinchu (TW); Shih Chi Chien, Hsinchu (TW); Ming Tsan Kao, Hsinchu (TW); Hsin Chia Chen, Hsinchu (TW); Chao Chien Huang, Hsinchu (TW); Cho Yi Lin, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 990 days.

This patent is subject to a terminal disclaimer.

(21) Appl. No.: 12/883,871

(22) Filed: Sep. 16, 2010

(65) Prior Publication Data
US 2012/0001848 A1 Jan. 5, 2012

(30) Foreign Application Priority Data
Jun. 30, 2010 (TW) .............................. 99121575 A

(51) Int. Cl.
*G06F 3/033* (2013.01)
*G06F 1/32* (2006.01)
*G06F 3/03* (2006.01)

(52) U.S. Cl.
CPC ............ *G06F 1/3259* (2013.01); *G06F 3/0304* (2013.01); *G06F 3/033* (2013.01); *Y02B 60/1253* (2013.01); *Y02B 60/148* (2013.01)

(58) Field of Classification Search
None
See application file for complete search history.

(56) References Cited

U.S. PATENT DOCUMENTS

| 6,781,570 | B1 * | 8/2004 | Arrigo et al. ................... 345/158 |
| 6,791,700 | B2 * | 9/2004 | Omura et al. ................... 356/620 |
| 6,797,937 | B2 * | 9/2004 | Norskog et al. ............... 250/221 |
| 7,427,981 | B2 * | 9/2008 | DePue et al. ................... 345/166 |
| 2006/0033822 | A1 * | 2/2006 | Lee et al. .................... 348/222.1 |
| 2006/0238502 | A1 * | 10/2006 | Kanamori et al. ............ 345/156 |
| 2006/0284857 | A1 | 12/2006 | Oh |
| 2007/0060384 | A1 * | 3/2007 | Dohta .............................. 463/43 |
| 2007/0176899 | A1 * | 8/2007 | Yoo et al. ....................... 345/158 |

(Continued)

OTHER PUBLICATIONS

Intellectual Property Office, Ministry of Economic Affairs, R.O.C., "Office Action", Feb. 18, 2014, Taiwan.

*Primary Examiner* — Srilakshmi K Kumar
*Assistant Examiner* — Stephen T Reed
(74) *Attorney, Agent, or Firm* — Locke Lord LLP; Tim Tingkang Xia, Esq.

(57) ABSTRACT

An interactive pointing device capable of switching capture ranges includes an image capturing element and a processing unit. The image capturing element operates in a first capture range or a second capture range. The image capturing element is used for capturing a light source, and outputting an image signal. When a distance from the interactive pointing device to the light source is smaller than a reference value, the processing unit controls the image capturing element to detect the light source with the first capture range, and the processing unit converts the image signal into a first coordinate data. When the distance is greater than the reference value, the processing unit controls the image capturing element to detect the light source with the second capture range, and the processing unit converts the image signal into a second coordinate data.

19 Claims, 6 Drawing Sheets

(56) References Cited

U.S. PATENT DOCUMENTS

| | | | |
|---|---|---|---|
| 2007/0211050 A1* | 9/2007 | Ohta | 345/426 |
| 2007/0273646 A1* | 11/2007 | Chao et al. | 345/157 |
| 2008/0117167 A1* | 5/2008 | Aonuma et al. | 345/157 |
| 2008/0158436 A1* | 7/2008 | Chao et al. | 348/734 |
| 2008/0266251 A1* | 10/2008 | Chao et al. | 345/157 |
| 2009/0052730 A1* | 2/2009 | Lin | 382/100 |
| 2010/0060575 A1* | 3/2010 | Ohta | 345/158 |
| 2010/0289740 A1* | 11/2010 | Kim et al. | 345/157 |
| 2011/0316773 A1* | 12/2011 | Lu et al. | 345/157 |

* cited by examiner

INTERACTIVE POINTING DEVICE CAPABLE OF SWITCHING CAPTURE RANGES AND METHOD FOR SWITCHING CAPTURE RANGES FOR USE IN INTERACTIVE POINTING DEVICE

CROSS-REFERENCE TO RELATED APPLICATIONS

This non-provisional application claims priority under 35 U.S.C. §119(a) on Patent Application No(s). 099121575 filed in Taiwan, R.O.C. on Jun. 30, 2010, the entire contents of which are hereby incorporated by reference.

BACKGROUND OF THE INVENTION

1. Field of the Invention

The present invention relates to an interactive pointing device and a pointing method, and more particularly to an interactive pointing device capable of switching capture ranges and a method for switching capture ranges.

2. Related Art

In recent years, with the rapid development of technologies, interactive multimedia devices become more and more popular. The interactive multimedia devices allow users to interact with sounds and images, so as to experience entertainment.

A control device is required to be used in combination with the interactive multimedia device. In addition to control devices for control through buttons, more advanced control devices are further equipped with technologies of pointing and motion sensing. Pointing is used to control a cursor on a screen as a mouse, and motion sensing is used to detect movement and rotation in three-dimensional space.

The pointing technology needs to use an image sensing element to detect a direction pointed by the control device. However, common image sensing elements have a fixed capture range, and when a target sensed by the image sensing element leaves the capture range, the image sensing element cannot successfully point to the target. That is to say, the user must adapt to the limited capture range of the image sensing element, so as to operate the interactive device. If the capture range is too small, the convenience in use is greatly limited.

On the other hand, if the capture range is expanded, the power consumption of the image sensing element is increased. Moreover, the power consumption of the image sensing element is proportional to the square of the capture range. That is to say, if the capture range is doubled, the power consumption will be quadrupled. Furthermore, as the control elements are generally handheld, the control elements require a battery as a power source. The higher the power consumption is, the shorter the service life of the battery will be.

Therefore, a conflict between the size of the capture range and power consumption is encountered in designing the control device.

SUMMARY OF THE INVENTION

In view of the above problems, the present invention provides an interactive pointing device capable of switching capture ranges. The interactive pointing device comprises an image capturing element and a processing unit. The image capturing element operates in a first capture range or a second capture range. The image capturing element is used for capturing a light source, and outputting an image signal. When a distance from the interactive pointing device to the light source is smaller than a reference value, the processing unit controls the image capturing element to detect the light source with the first capture range, and the processing unit converts the image signal into a first coordinate data. When the distance is greater than the reference value, the processing unit controls the image capturing element to detect the light source with the second capture range, and the processing unit converts the image signal into a second coordinate data.

In addition, the present invention further provides a method for switching capture ranges for use in an interactive pointing device, which comprises: providing an image capturing element and a processing unit; detecting a point light source and outputting an image signal by using the image capturing element; obtaining a distance from the point light source to the interactive pointing device; and when the distance is smaller than a reference value, controlling the image capturing element to operate with a first capture range to detect an optical signal, and converting the image signal into a first coordinate data by the processing unit, and when the distance is greater than the reference value, controlling the image capturing element to operate with a second capture range to detect the optical signal, and converting the image signal into a second coordinate data by the processing unit.

Based on the above, the interactive pointing device of the present invention is capable of automatically changing capture ranges according to different capture angles, so as to eliminate the situation that the interactive pointing device cannot capture any signal. Furthermore, when performing detection in a small range, the interactive pointing device can detect at a high sampling frequency.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
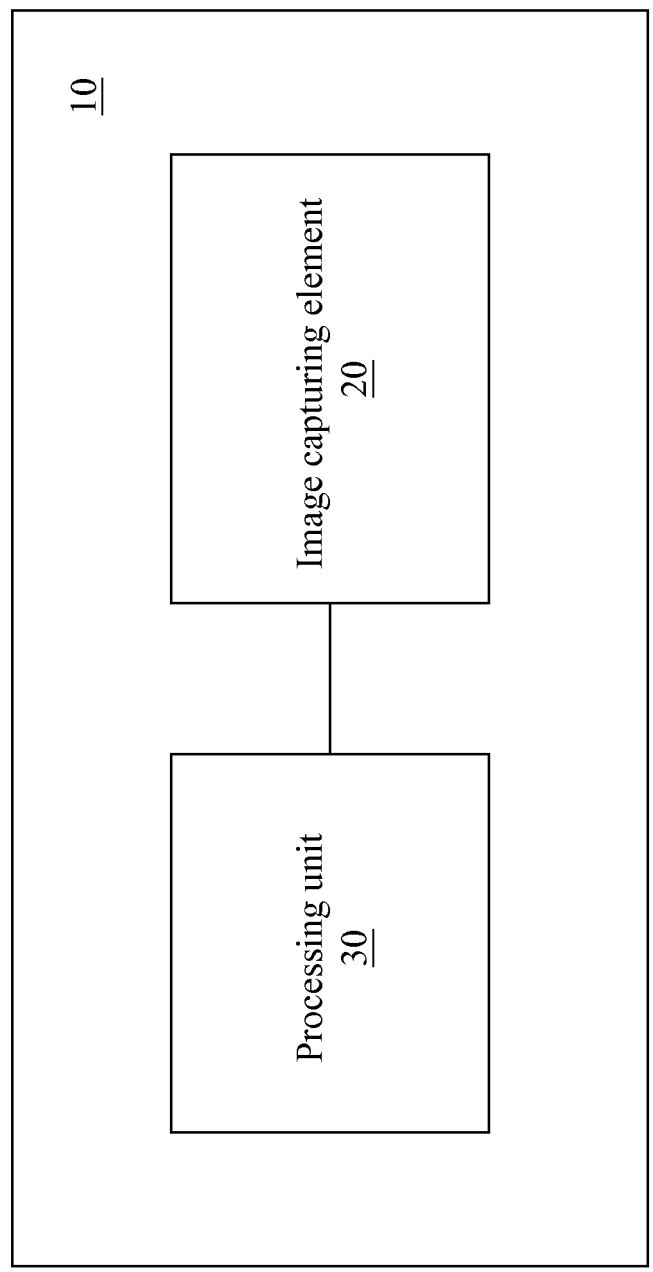
FIG. 1 is a block architecture diagram of a first embodiment of an interactive pointing device according to the present invention.
Figure 2:
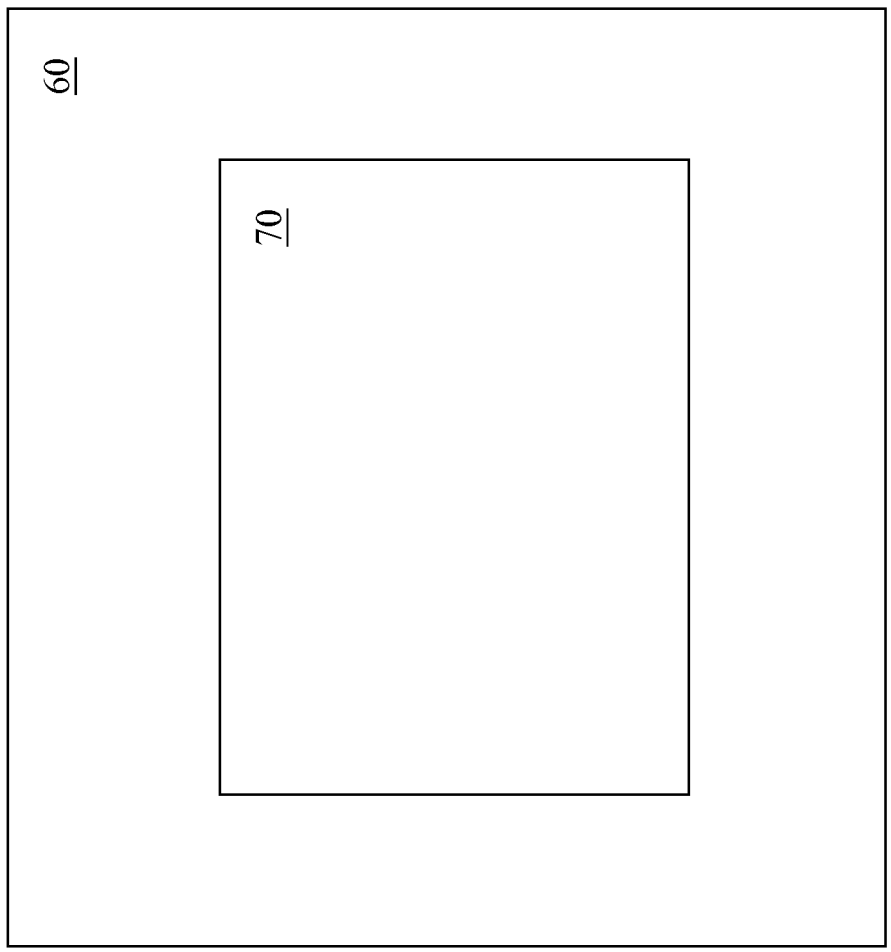
FIG. 2 is a schematic view of capture ranges of an image capturing element according to the present invention.

FIG. 1 is a block architecture diagram of a first embodiment of an interactive pointing device according to the present invention, and FIG. 2 is a schematic view of capture ranges of an image capturing element according to the present invention. Referring to FIGS. 1 and 2, an interactive pointing device 10 comprises an image capturing element 20 and a processing unit 30.

The image capturing element 20 is used for capturing a light source, and outputting an image signal. The image capturing element 20 may be a charge-coupled device (CCD) or a complementary metal-oxide-semiconductor (CMOS). When capturing the light source, the image capturing element 20 may operate in a first capture range 60 or a second capture range 70. The first capture range 60 comprises the second capture range 70. For example, the range corresponding to the first capture range 60 is 160×160 pixels, and the range corresponding to the second capture range 70 is 96×128 pixels.

The processing unit 30 is electrically connected to the image capturing element 20, and is used for receiving the image signal from the image capturing element 20. The processing unit 30 compares the image signals output by the image capturing element 20 at different time points, processes and analyzes the image signals according to a switching signal, and generates a coordinate data. When a distance from the interactive pointing device 10 to the light source is smaller than a reference value, the processing unit 30 controls the image capturing element 20 to detect the light source with the first capture range 60, and the processing unit 30 converts the image signal into a first coordinate data. When the distance is greater than the reference value, the processing unit 30 controls the image capturing element 20 to detect the light source with the second capture range 70, and the processing unit 30 converts the image signal into a second coordinate data.

The image capturing element 20 and the processing unit 30 may be integrated in a single chip.

The distance from the interactive pointing device 10 to the light source may be estimated by the processing unit 30. The processing unit 30 may estimate the distance according to the following methods: (I) determining the distance according to a size of the light source in the image signal; (II) determining the distance according to a time of arrival of the light source at the image capturing element 20; and (III) determining the distance according to a spacing (or called distance) between a first point light source and a second point light source in the image signal.

In the first method, the closer the light source is to the interactive pointing device 10, the larger the area of the light source displayed on the image capturing element 20 is, and vise versa. Therefore, the distance can be determined according to the number of pixels corresponding to spots on the image capturing element 20. The greater the number of the pixels corresponding to the spots is, the closer the light source is to the interactive pointing device 10.

In the second method, a longer time of arrival of the light source at the image capturing element 20 represents a greater distance from the light source to the interactive pointing device 10. Therefore, the processing unit 30 can control the light source to emit a signal at a fixed time, and calculate a time interval from a time point at which the signal is transmitted to a time point at which the signal is received by the image capturing element 20, so as to determine the distance from the light source to the image capturing element 20.

In the third method, the light source comprises two or more point light sources, for example, a first point light source and a second point light source. In fact, the first point light source and the second point light source are spaced by a fixed distance. The first point light source and the second point light source may be captured by the image capturing element 20. A distance between the first point light source and second point light source displayed on the image capturing element 20 is proportional to the distance from the light source to the image capturing element 20. That is to say, the distance from the light source to the image capturing element 20 may be determined by determining the distance between the first point light source and the second point light source captured by the image capturing element 20.

Figure 3:
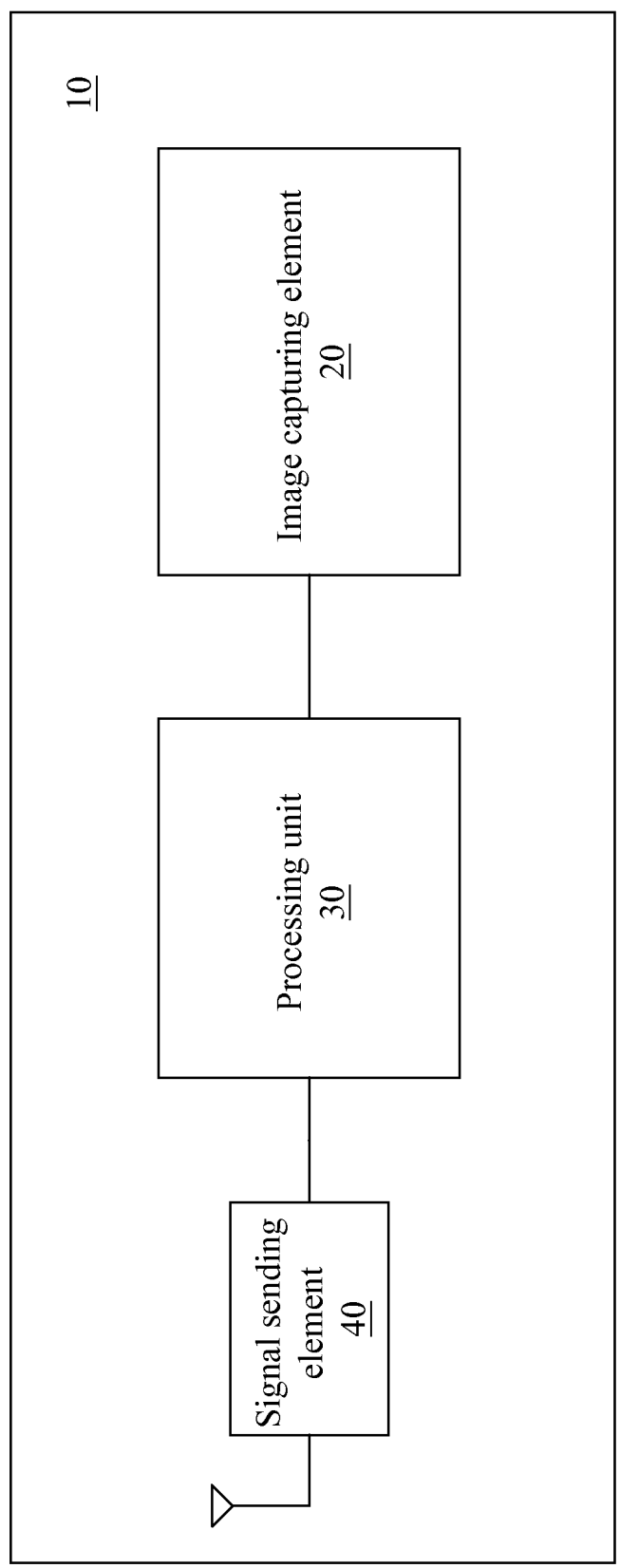
FIG. 3 is a block architecture diagram of a second embodiment of the interactive pointing device according to the present invention.

FIG. 3 is a block architecture diagram of a second embodiment of the interactive pointing device according to the present invention. Referring to FIG. 3, an interactive pointing device 10 comprises an image capturing element 20, a processing unit 30, and a signal sending element 40.

The signal sending element 40 is electrically connected to the processing unit 30, and is used for transmitting a coordinate data generated by the processing unit 30 to a host.

In this embodiment, the signal sending element 40 may be a wired or wireless signal transceiver element, for example, a wireless transmission element conforming to Bluetooth specifications.

Figure 4:
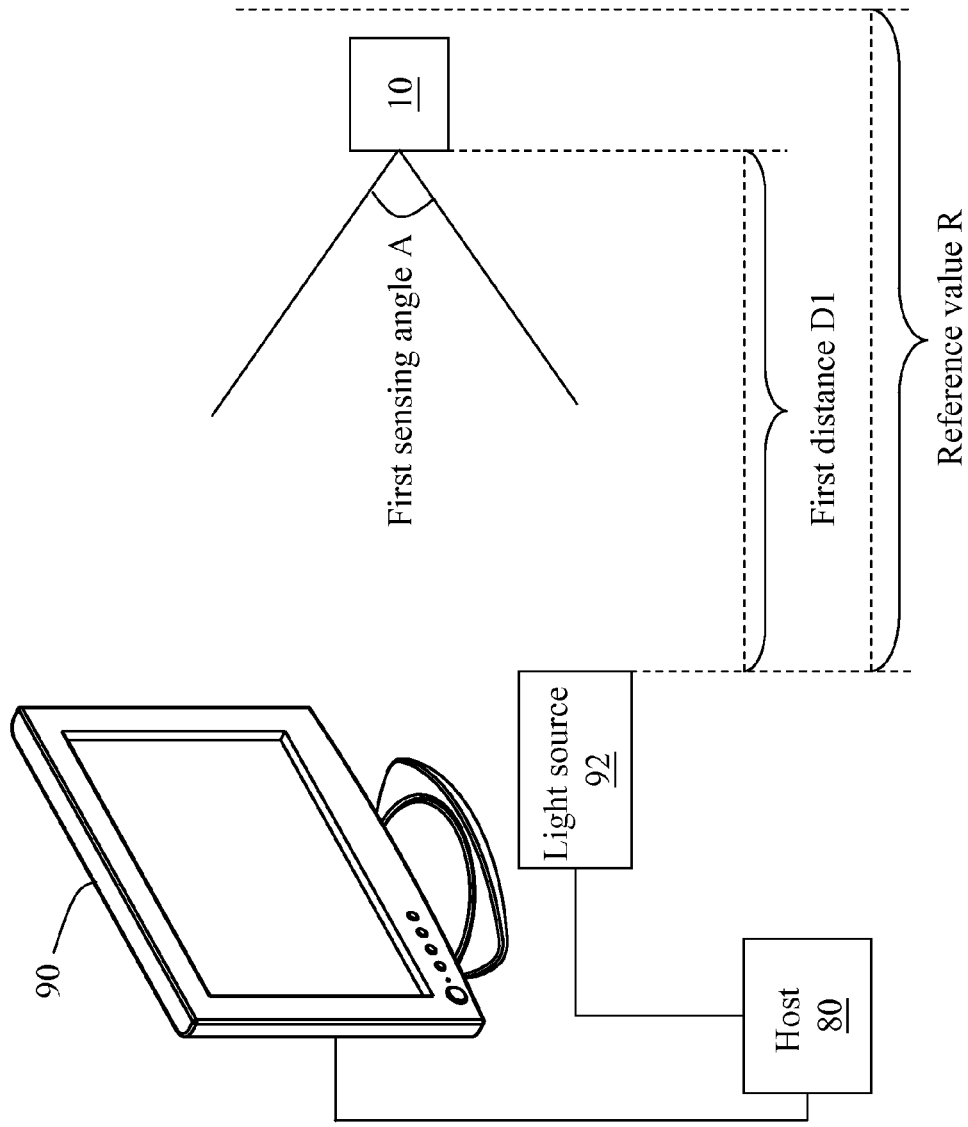
FIG. 4 is a schematic view of a first embodiment of an application of the pointing device of the present invention in an interactive system.
Figure 5:
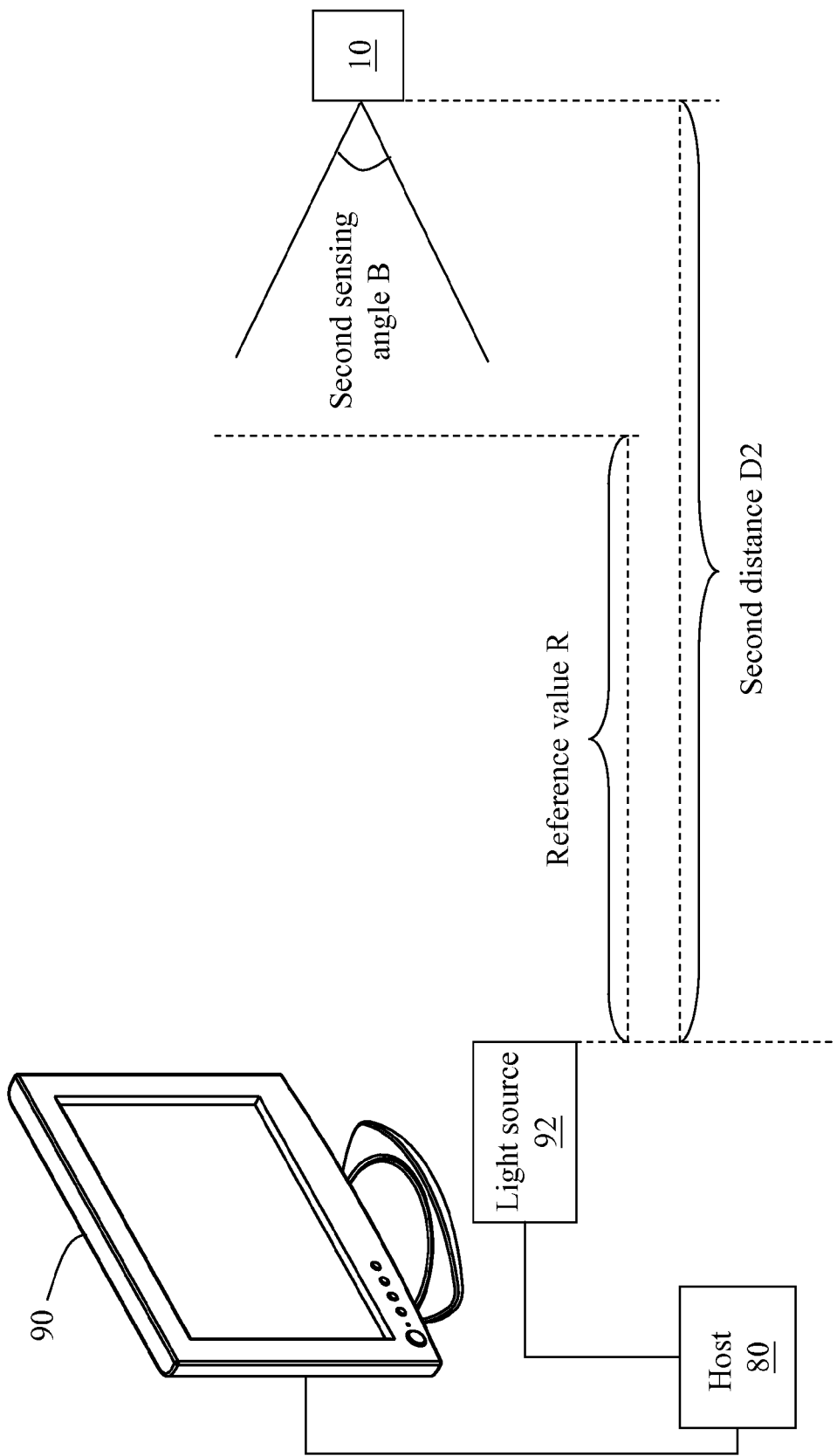
FIG. 5 is a schematic view of a second embodiment of an application of the pointing device of the present invention in an interactive system.

FIG. 4 is a schematic view of a first embodiment of an application of the pointing device of the present invention in an interactive system, and FIG. 5 is a schematic view of a second embodiment of an application of the pointing device of the present invention in an interactive system.

Referring to FIGS. 4 and 5, the interactive system comprises a display screen 90, a host 80, a light source 92, and an interactive pointing device 10. The light source 92 is disposed above or below the display screen 90, and comprises a plurality of infrared sources. The interactive pointing device 10 has an image capturing element 20 capable of capturing an optical signal sent by the light source 92, and according to the optical signals captured by the image capturing element 20 of the interactive pointing device 10 capable of switching capture ranges at different time points, the processing unit 30 calculates corresponding coordinates, which are reflected on the display screen 90.

As shown in FIG. 4, when the distance from the interactive pointing device 10 to the light source 92 is a first distance D1, and the first distance D1 is smaller than a reference value R, the interactive pointing device 10 has a first sensing angle A. As shown in FIG. 5, when the distance from the interactive pointing device 10 to the light source 92 is a second distance D2, and the second distance D2 is greater than the reference value R, the interactive pointing device 10 has a second sensing angle B. The first sensing angle A is larger than the second sensing angle B.

When a user operates the interactive pointing device 10, if the interactive pointing device 10 is converted from the first sensing angle A into the second sensing angle B, or is converted from the second sensing angle B into the first sensing angle A, the coordinate data generated by the processing unit 30 needs to be processed through numeric conversion. If the coordinate data is not processed through numeric conversion, the output coordinate data varies with different capture ranges used by the image capturing element 20 for capturing. That is to say, if the coordinate data is not processed through numeric conversion, when the interactive pointing device 10 is converted from the first sensing angle A into the second sensing angle B, or is converted from the second sensing angle B into the first sensing angle A, a cursor displayed on the display screen 90 will jump rapidly, resulting in inconvenience in use.

Therefore, coordinate conversion is necessary for the coordinate value output by the processing unit 30, such that the interactive pointing device 10 can generate the same coordinate data, regardless of operating at the first sensing angle A or the second sensing angle B.

Furthermore, when the distance from the interactive pointing device 10 to the light source 92 is smaller than the reference value R, the image capturing element 20 captures the signal with the first capture range 60. As the first capture range 60 is greater than the second capture range 70, more power is consumed each time the first capture range 60 is used for capturing the signal. In order to maintain constant power consumption regardless of whether the image capturing element 20 uses the first capture range 60 or the second capture range 70, when the image capturing element 20 captures the signal with the first capture range 60, the image capturing element 20 uses a low sampling frequency for capturing, and when the image capturing element 20 captures the signal with the second capture range 70, the image capturing element 20 uses a high sampling frequency for capturing.

Figure 6:
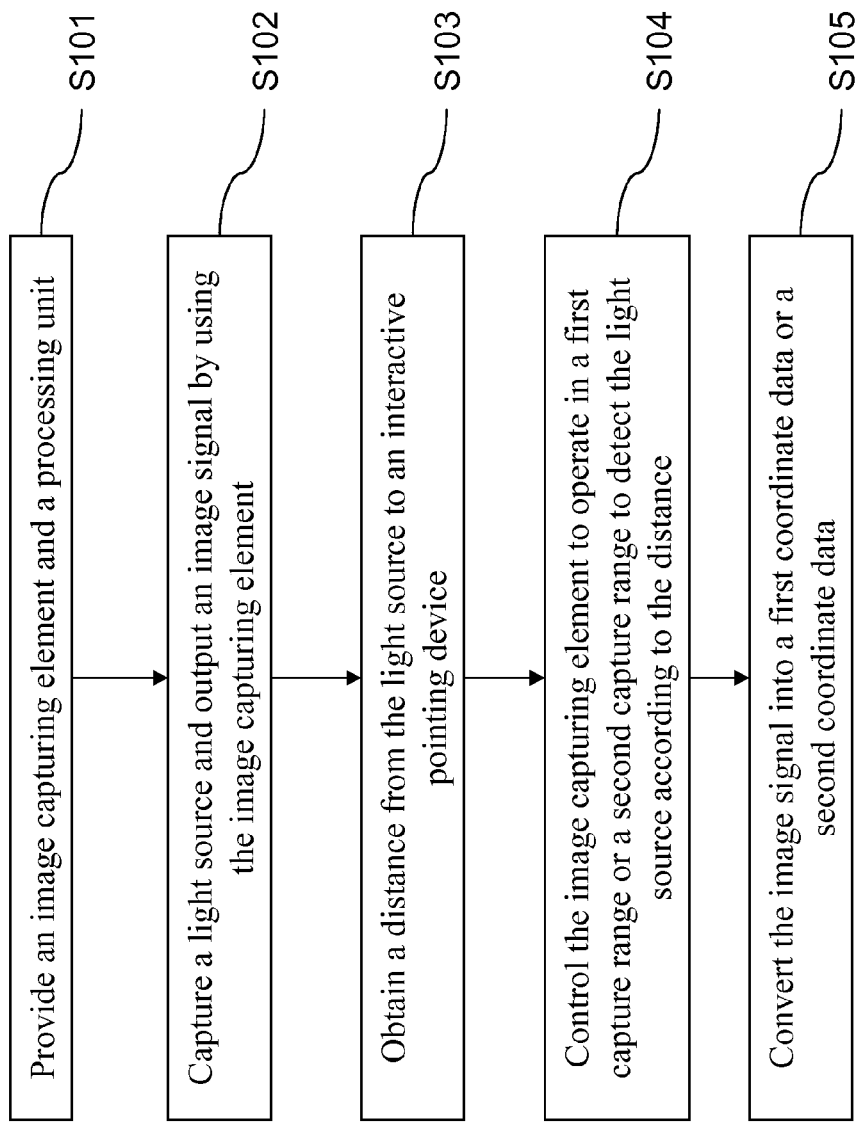
FIG. 6 is a flow chart of a method for switching capture ranges according to the present invention.

FIG. 6 is a flow chart of a method for switching capture ranges according to the present invention.

In Step S101, an image capturing element 20 and a processing unit 30 are provided.

In Step S102, the image capturing element 20 captures a light source 92, and outputs an image signal. The processing unit 30 is electrically connected to the image capturing element 20, and is used for receiving the image signal from the image capturing element 20.

In Step S103, a distance from the light source 92 to an interactive pointing device 10 is obtained. A method for obtaining the distance may be performed by the processing unit 30. The processing unit 30 may estimate the distance according to the following methods: (I) determining the distance according to a size of the light source in the image signal; (II) determining the distance according to a time of arrival of the light source at the image capturing element 20; and (III) determining the distance according to a spacing (or distance) between a first point light source and a second point light source in the image signal.

In Step S104, according to the distance, the image capturing element 20 is controlled to operate in a first capture range 60 or a second capture range 70 to detect the light source 92. That is to say, when the distance is smaller than a reference value R, the image capturing element 20 detects the light source 92 with the first capture range 60. When the distance is greater than the reference value R, the image capturing element 20 detects the light source 92 with the second capture range 70.

In Step S105, according to the image signal detected by the image capturing element 20, the processing unit 30 converts the image signal into a first coordinate data or a second coordinate data. In order to maintain the position of the cursor unchanged, the first coordinate data or the second coordinate data needs to be converted, so as to be corresponding to the same position.

Based on the above, the interactive pointing device of the present invention is capable of automatically changing capture ranges according to different capture angles, so as to eliminate the situation that the interactive pointing device cannot capture any signal. Furthermore, the same power consumption can be maintained regardless of whether the interactive pointing device performs detection in a large range or a small range.

What is claimed is:

1. An interactive pointing device capable of switching capture ranges, comprising:
    an image capturing element, configured to:
        detect a light source with a first sensing angle and a first capture range to output a first image having a first pixel area when a distance from the interactive pointing device to the light source is smaller than a reference value, and
        detect the light source with a second sensing angle and a second capture range to output a second image having a second pixel area when the distance is greater than the reference value,
    wherein the first capture range and the second capture range correspond to areas of the image capturing element that are used for sensing light and are respectively defined by a number of pixels, the first sensing angle and the second sensing angle respectively correspond to the first and second capture ranges, the image capturing element operates using the first capture range of the image capturing element at the first sensing angle to sense light, and operates using the second capture range of the image capturing element at the second sensing angle to sense light, the first capture range of the image capturing element is larger than the second capture range of the image capturing element, such that the first pixel area is larger than the second pixel area; and
    a processing unit for controlling the image capturing element to detect the light source with the first sensing angle and the first capture range or with the second sensing angle and the second capture range, converting the first image into a first coordinate data, and converting the second image into a second coordinate data.

2. The interactive pointing device capable of switching capture ranges according to claim 1, wherein the first sensing angle comprises the second sensing angle.

3. The interactive pointing device capable of switching capture ranges according to claim 1, wherein the processing unit determines the distance from the interactive pointing device to the light source according to a size of the light source shown in the first or second image.

4. The interactive pointing device capable of switching capture ranges according to claim 1, wherein the processing unit determines the distance from the interactive pointing device to the light source according to a time of arrival of the light source at the image capturing element.

5. The interactive pointing device capable of switching capture ranges according to claim 1, wherein the light source comprises a first point light source and a second point light source, and the processing unit determines the distance from the interactive pointing device to the light source according to a spacing between the first point light source and the second point light source shown in the first or second image.

6. The interactive pointing device capable of switching capture ranges according to claim 1, wherein when the distance is smaller than the reference value, the processing unit samples the first image by a first sampling frequency, and when the distance is greater than the reference value, the processing unit samples the second image by a second sampling frequency, and the first sampling frequency is smaller than the second sampling frequency.

7. The interactive pointing device capable of switching capture ranges according to claim 1, further comprising a signal sending element, for transmitting the first coordinate data or the second coordinate data.

8. The interactive pointing device capable of switching capture ranges according to claim 7, wherein the signal sending element is compatible with a Bluetooth transmission standard.

9. The interactive pointing device capable of switching capture ranges according to claim 1, wherein the image capturing element and the processing unit are integrated in a single chip.

10. The interactive pointing device capable of switching capture ranges according to claim 1, wherein the processing unit compares the first images output by the image capturing element at different time points, so as to calculate the first coordinate data or compares the second images output by the image capturing element at different time points, so as to calculate the second coordinate data.

11. The interactive pointing device capable of switching capture ranges according to claim 1, wherein the image capturing element is a charge-coupled device (CCD) or a complementary metal-oxide-semiconductor (CMOS).

12. A method for switching capture ranges for use in an interactive pointing device, comprising:
obtaining a distance from a light source to the interactive pointing device;
when the distance is smaller than a reference value, controlling an image capturing element to detect the light source with a first sensing angle and a first capture range of the image capturing element to output a first image having a first pixel area, and converting the first image into a first coordinate data by a processing unit; and
when the distance is greater than the reference value, controlling the image capturing element to detect the light source with a second sensing angle and a second capture range of the image capturing element to output a second image having a second pixel area, and converting the second image into a second coordinate data by the processing unit,
wherein the first capture range and the second capture range correspond to areas of the image capturing element that are used for sensing light and are respectively defined by a number of pixels, the first sensing angle and the second sensing angle respectively correspond to the first and second capture ranges, and the first capture range of the image capturing element is larger than the second capture range of the image capturing element, such that the first pixel area is larger than the second pixel area.

13. The method for switching capture ranges according to claim 12, wherein the first sensing angle comprises the second sensing angle.

14. The method for switching capture ranges according to claim 12, wherein the distance from the interactive pointing device to the light source is determined according to a size of the light source shown in the first or second image.

15. The method for switching capture ranges according to claim 12, wherein the distance from the interactive pointing device to the light source is determined according to a time of arrival of the light source at the image capturing element.

16. The method for switching capture ranges according to claim 12, wherein the light source comprises a first point light source and a second point light source, and the distance from the interactive pointing device to the light source is determined according to a spacing between the first point light source and the second point light source shown in the first or second image.

17. The method for switching capture ranges according to claim 12, wherein when the distance is smaller than the reference value, the first image is sampled by the processing unit at a first sampling frequency, and when the distance is greater than the reference value, the second image is sampled by the processing unit at a second sampling frequency, and the first sampling frequency is smaller than the second sampling frequency.

18. The method for switching capture ranges according to claim 12, further comprising transmitting the first coordinate data or the second coordinate data.

19. The method for switching capture ranges according to claim 12, wherein the processing unit compares the first images output by the image capturing element at different time points, so as to calculate the first coordinate data or compares the second images output by the image capturing element at different time points, so as to calculate the second coordinate data.

* * * * *